(12) United States Patent
Wang et al.

(10) Patent No.: US 10,074,034 B2
(45) Date of Patent: Sep. 11, 2018

(54) IMAGE PROCESSING INCLUDING ADJOIN FEATURE BASED OBJECT DETECTION, AND/OR BILATERAL SYMMETRIC OBJECT SEGMENTATION

(71) Applicant: INTEL CORPORATION, Santa Clara, CA (US)

(72) Inventors: Tao Wang, Beijing (CN); Lianrui Fu, Beijing (CN); Qiang Li, Beijing (CN); Jianguo Li, Beijing (CN); Yurong Chen, Beijing (CN); Ya-ti Peng, Sunnyvale, CA (US); Yimin Zhang, Beijing (CN); Anbang Yao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 14/124,233

(22) PCT Filed: Jun. 14, 2013

(86) PCT No.: PCT/CN2013/077228
§ 371 (c)(1),
(2) Date: Dec. 5, 2013

(87) PCT Pub. No.: WO2014/198055
PCT Pub. Date: Dec. 18, 2014

(65) Prior Publication Data
US 2014/0369608 A1 Dec. 18, 2014

(51) Int. Cl.
*G06K 9/62* (2006.01)
*G06K 9/68* (2006.01)
(52) U.S. Cl.
CPC .............. *G06K 9/6211* (2013.01); *G06K 9/68* (2013.01)

(58) Field of Classification Search
CPC .......... G06K 9/6211; G06K 9/68; G06K 9/46; G06F 3/04845; G06T 7/004
See application file for complete search history.

(56) References Cited

U.S. PATENT DOCUMENTS 5,067,162 A * 11/1991 Driscoll, Jr. ....... G06K 9/00067
382/126
5,585,861 A * 12/1996 Taniguchi ................ H04N 9/78
348/663
(Continued)

FOREIGN PATENT DOCUMENTS

| CN | 1361501 A | 7/2002 |
|---|---|---|
| CN | 1384464 A | 12/2002 |

(Continued)

OTHER PUBLICATIONS

Partial Supplementary European Search Report dated Jan. 26, 2017 for European Application No. 13886672.8, 8 pages.
(Continued)

*Primary Examiner* — Iman K Kholdebarin
*Assistant Examiner* — Mai Tran
(74) *Attorney, Agent, or Firm* — Schwabe, Williamson & Wyatt, P.C.

(57) ABSTRACT

Apparatuses, methods and storage medium associated with processing an image are disclosed herein. In embodiments, a method for processing one or more images may include generating a plurality of pairs of keypoint features for a pair of images. Each pair of keypoint features may include a keypoint feature from each image. Further, for each pair of keypoint features, corresponding adjoin features may be generated. Additionally, for each pair of keypoint features, whether the adjoin features are similar may be determined. Whether the pair of images have at least one similar object may also be determined, based at least in part on a result of (Continued)

the determination of similarity between the corresponding adjoin features. Other embodiments may be described and claimed.

16 Claims, 9 Drawing Sheets

(56) References Cited

U.S. PATENT DOCUMENTS

| | | | |
|---|---|---|---|
| 6,639,691 B2* | 10/2003 | Acharya | H04N 1/648 |
| | | | 358/1.9 |
| 6,711,293 B1 | 3/2004 | Lowe | |
| 6,834,119 B2* | 12/2004 | Chen | H04N 13/0242 |
| | | | 348/E13.015 |
| 8,442,307 B1* | 5/2013 | Anati | G06T 7/73 |
| | | | 382/154 |
| 8,582,821 B1* | 11/2013 | Feldman | G06T 7/248 |
| | | | 348/169 |
| 9,275,432 B2* | 3/2016 | Wang | G06T 3/0075 |
| 2003/0146913 A1* | 8/2003 | Shen | G06T 7/0012 |
| | | | 345/419 |
| 2004/0022431 A1 | 2/2004 | Beardsley | |
| 2004/0114800 A1* | 6/2004 | Ponomarev | G06T 7/0012 |
| | | | 382/173 |
| 2005/0265601 A1 | 12/2005 | Cathier et al. | |
| 2006/0153447 A1* | 7/2006 | Ouchi | G06F 17/30247 |
| | | | 382/173 |
| 2007/0047840 A1* | 3/2007 | Xu | G06K 9/3216 |
| | | | 382/294 |
| 2009/0129655 A1* | 5/2009 | Lossev | G06K 9/6297 |
| | | | 382/132 |
| 2009/0184171 A1* | 7/2009 | Lv | G06K 19/06037 |
| | | | 235/494 |
| 2010/0103257 A1* | 4/2010 | Chang | G06T 5/006 |
| | | | 348/135 |
| 2010/0119113 A1* | 5/2010 | Kuleschow | G06T 7/11 |
| | | | 382/103 |
| 2011/0026833 A1* | 2/2011 | Sugino | B25J 9/1697 |
| | | | 382/201 |
| 2011/0085728 A1* | 4/2011 | Gao | G06K 9/4671 |
| | | | 382/165 |
| 2012/0051656 A1* | 3/2012 | Wang | G06T 7/97 |
| | | | 382/201 |
| 2012/0263388 A1* | 10/2012 | Vaddadi | G06F 17/30247 |
| | | | 382/225 |
| 2013/0188018 A1* | 7/2013 | Stevens | G06T 7/0004 |
| | | | 348/46 |
| 2014/0133550 A1* | 5/2014 | Pau | H04N 19/503 |
| | | | 375/240.03 |
| 2015/0043828 A1* | 2/2015 | Valente | G06K 9/46 |
| | | | 382/201 |

FOREIGN PATENT DOCUMENTS

| | | |
|---|---|---|
| CN | 1430767 A | 7/2003 |
| CN | 1508756 A | 6/2004 |
| CN | 1628325 A | 6/2005 |
| CN | 1755709 A | 4/2006 |
| CN | 101764923 A | 6/2010 |
| CN | 102075729 A | 5/2011 |
| CN | 102236901 A | 11/2011 |
| DE | 19702728 A1 | 8/1997 |
| TW | 201133357 A1 | 10/2011 |
| TW | 201209758 A1 | 3/2012 |

OTHER PUBLICATIONS

D. G. Lowe, "Object Recognition from Local Scale-Invariant Features", Proceedings of the Seventh IEEE International Conference on Computer Vision, Jan. 1, 1999, 8 pages.

Wikipedia: "Scale-invariant feature transform", Jan. 17, 2017, retrieved from the Internet: URL:https://en.wikipedia.org/wiki/Scale-invariant_feature_transform, 17 pages.

International Search Report and Written Opinion dated Mar. 13, 2014 for International Application No. PCT/CN2013/077228, 10 pages.

Extended European Search Report dated Apr. 28, 2017 for European Application No. 13886672.8, 11 pages.

Office Action dated May 2, 2018 for Chinese Patent Application No. 201380076574.0, 19 pages.

* cited by examiner

IMAGE PROCESSING INCLUDING ADJOIN FEATURE BASED OBJECT DETECTION, AND/OR BILATERAL SYMMETRIC OBJECT SEGMENTATION

CROSS REFERENCE TO RELATED APPLICATIONS

The present application is a national phase entry under 35 U.S.C. § 371 of International Application No. PCT/CN2013/077228, filed Jun. 14, 2013, entitled "IMAGE PROCESSING INCLUDING ADJOIN FEATURE BASED OBJECT DETECTION, AND/OR BILATERAL SYMMETRIC OBJECT SEGMENTATION", which designated, among the various States, the United States of America. The Specification of the PCT/CN2013/077228 Application is hereby incorporated by reference.

TECHNICAL FIELD

The present disclosure relates to the field of data processing, in particular, to apparatuses, methods and storage medium associated with imaging processing, including but not limited to adjoin feature based object detection, and/or bilateral symmetric object segmentation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in general purpose microprocessors, graphics processors, networking, and related technologies have led to an increase in availability of multimedia contents via the Internet. Oftentimes, applications and/or users are interested in detection and/or classification of objects in images, in particular, computational efficient (and therefore power and/or energy efficient) object detection and/or classification, such as in the cases of mobile device, like smartphones and/or computing tablets.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
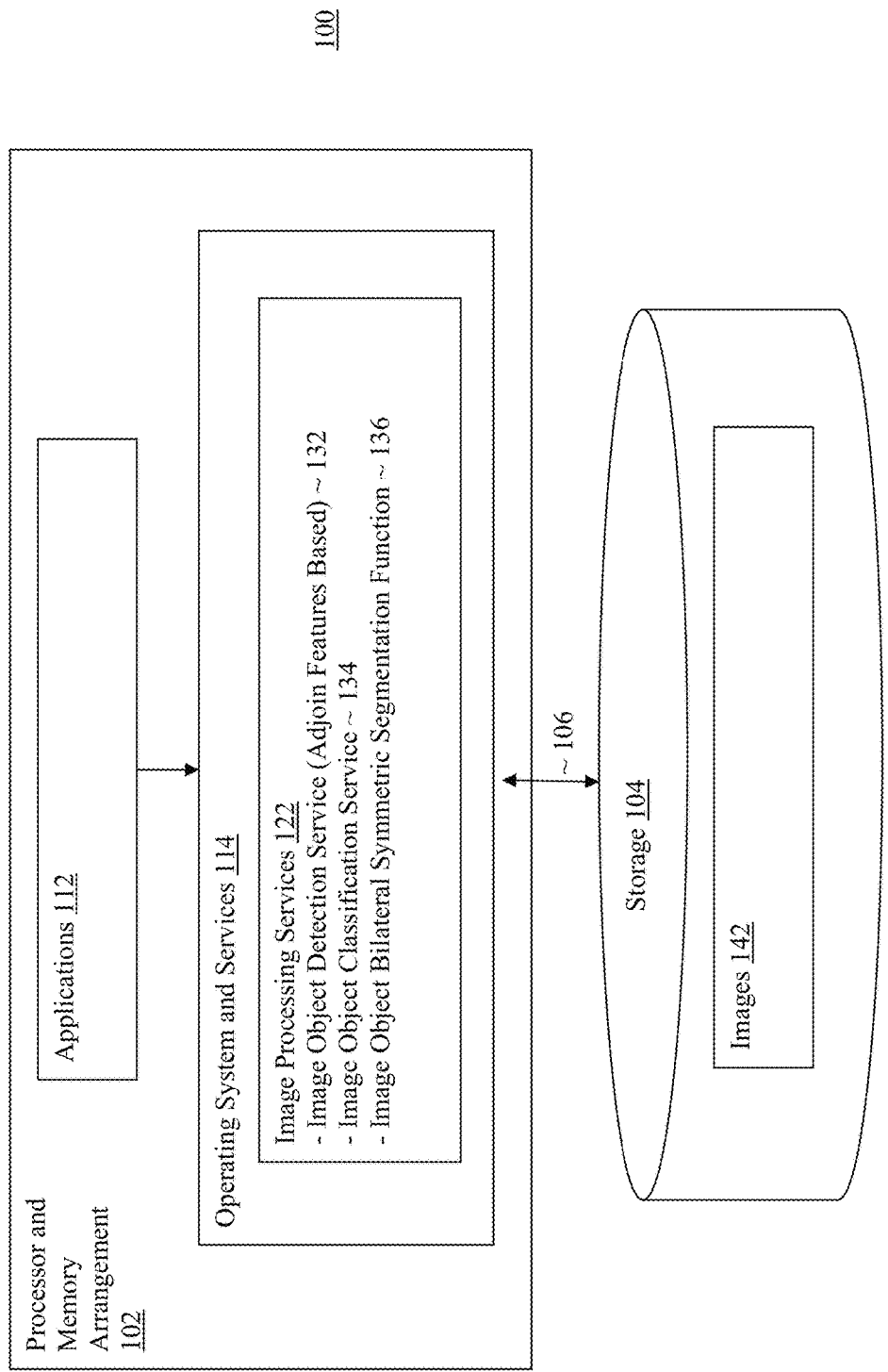
FIG. 1 illustrates an overview of an example computing arrangement incorporated with the teachings of the present disclosure for detection and/or classification of objects in images, in accordance with various embodiments.

Apparatuses, methods and storage medium associated with image processing, are disclosed herein. In embodiments, a method for processing one or more images may include generating, e.g., by a computing device, a plurality of pairs of keypoint features. Each pair of keypoint features may include a first keypoint feature from a first of the one or more images, and a second keypoint feature from a second of the one or more images. The computing device may further generate, for each pair of keypoint features, first one or more adjoin features for the first keypoint feature of the keypoint feature pair, and corresponding second one or more adjoin features for the second keypoint feature of the keypoint feature pair. The computing device may additionally determine for each pair of keypoint features, whether an adjoin feature of the first keypoint feature of the keypoint feature pair is similar to the corresponding adjoin feature of the second keypoint feature of the keypoint feature pair. The computing device may also determine whether the first and the second image have at least one similar object, based at least in part on a result of the determination of similarity between the corresponding adjoin features of the first and second keypoint features of the keypoint feature pairs.

In embodiments, a method for processing one or more images may include pairwise matching local features of an image, by a computing device, to generate an initial plurality of point pairs for the image. The computing device may further scale consistency check the point pairs to eliminate falsely matched point pairs from the initial plurality of point pairs, to result with a first intermediate plurality of scale consistency checked point pairs. The computing device may further content consistency check the first intermediate plurality of scale consistency checked point pairs, to discard dominant point pairs in background of the image, to result in a second intermediate plurality of content consistency checked point pairs. The computing device may additionally discriminative foreground and background modeling of the image based at least in part on the second intermediate plurality of content consistency checked point pairs. The computing device may also segment a bilateral symmetric object in the image based at least in part on geometric properties of the discriminative foreground and background modeled image.

In embodiments, an apparatus, e.g., a smartphone or a computing tablet, may include one or more processors, and at least one storage medium having instructions configured to cause the apparatus, in response to operation by the one or more processors, to perform one or more of the above described methods and their variants. In embodiments, at least one storage medium may include instructions, in response to execution by an apparatus, cause the apparatus to perform one or more of the above described methods and their variants.

In the detailed description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now FIG. 1, an overview of an example computing arrangement incorporated with the teachings of the present disclosure for detection and/or classification of objects in images, in accordance with various embodiments, is shown. As illustrated, in embodiments, computing arrangement 100 may include processor and memory arrangement 102, and storage 104, coupled with each other as shown. Processor and memory arrangement 102 may be configured to host and execute operating system and services 114 and applications 112, whereas storage 104 may be configured to store a number of images 142 accessible to applications 112. In embodiments, applications 112 may be executed under the control, and/or utilize the services of operating system and services 114. The services provided by operating system and services 114 may include various image processing services 122, which may include, in particular, Image Object Detection Service 132, Image Object Classification Service 134 and Image Object Bilateral Symmetric Segmentation Function 136, to be described more fully below.

Processor and memory arrangement 102 is intended to represent a broad range of processors and memory devices, including without limitations, arrangements designed for mobile computing. For examples, without limitations, processor may be any one of a number of single or multi-core general or special purpose processors known in the art. One or more general or special purpose processors may be used. An example of a special purpose processor may include, but is not limited to, a graphics processor. Memory may be any one of a number of volatile and/or non-volatile memory known in the art including, but are not limited to, dynamic random access memory (DRAM), FLASH, and so forth. Similarly, one or more memory units may be used. Storage 104 may be any one of a number of magnetic, optical, and/or solid state storage device or devices. Processor and memory arrangement 102 and storage 104 may be co-located on the same platform and coupled with each other 106 via, e.g., a system bus, or remotely located from each other, and coupled with each other 106 via, e.g., one or more private and/or public networks, such as the Internet. That is, processor and memory arrangement 102 alone, or in conjunction with storage 104, may form a single computing device, such as a smartphone, a computing tablet, an ultrabook, a laptop, a desktop, a server, a set-top box, a game console, a media player, an e-reader, and so forth.

Further, computing arrangement 100 may include other components, such as display devices, and/or wired or wireless communication interfaces. Display devices may be any one of a number of display devices known in the art including, but are not limited to, touch screen displays. An example of wired communication interfaces may include an Ethernet networking interface. Examples of wireless communication interfaces may include interfaces that support WiFi, 3G4G wireless communications. Computing arrangement 100 may also include input devices, such as keyboard or other cursor control and/or gesture recognition devices. Still further, computing arrangement 100 may include camera, Global Position System (GPS) support, and various sensors.

Still referring to FIG. 1, in various embodiments, Image Object Detection Service 132 may be configured to identify objects in an image, including identifying whether an object in a query image is in a reference image, having particular application in, e.g., image based search. In other words, Image Object Detection Service 132 may be used to determine whether a query image is among the images 142. In embodiments, Image Object Detection Service 132 may be configured to detect objects using keypoint features in the images. In particular, Image Object Detection Service 132 may be configured to detect objects using keypoint features in the images, in conjunction with adjoin features of the keypoint features. More particularly, Image Object Detection Service 132 may be configured to determine whether two keypoint features are similar, based at least in part on determining whether the corresponding adjoin features of the keypoint features are similar.

Figure 2:
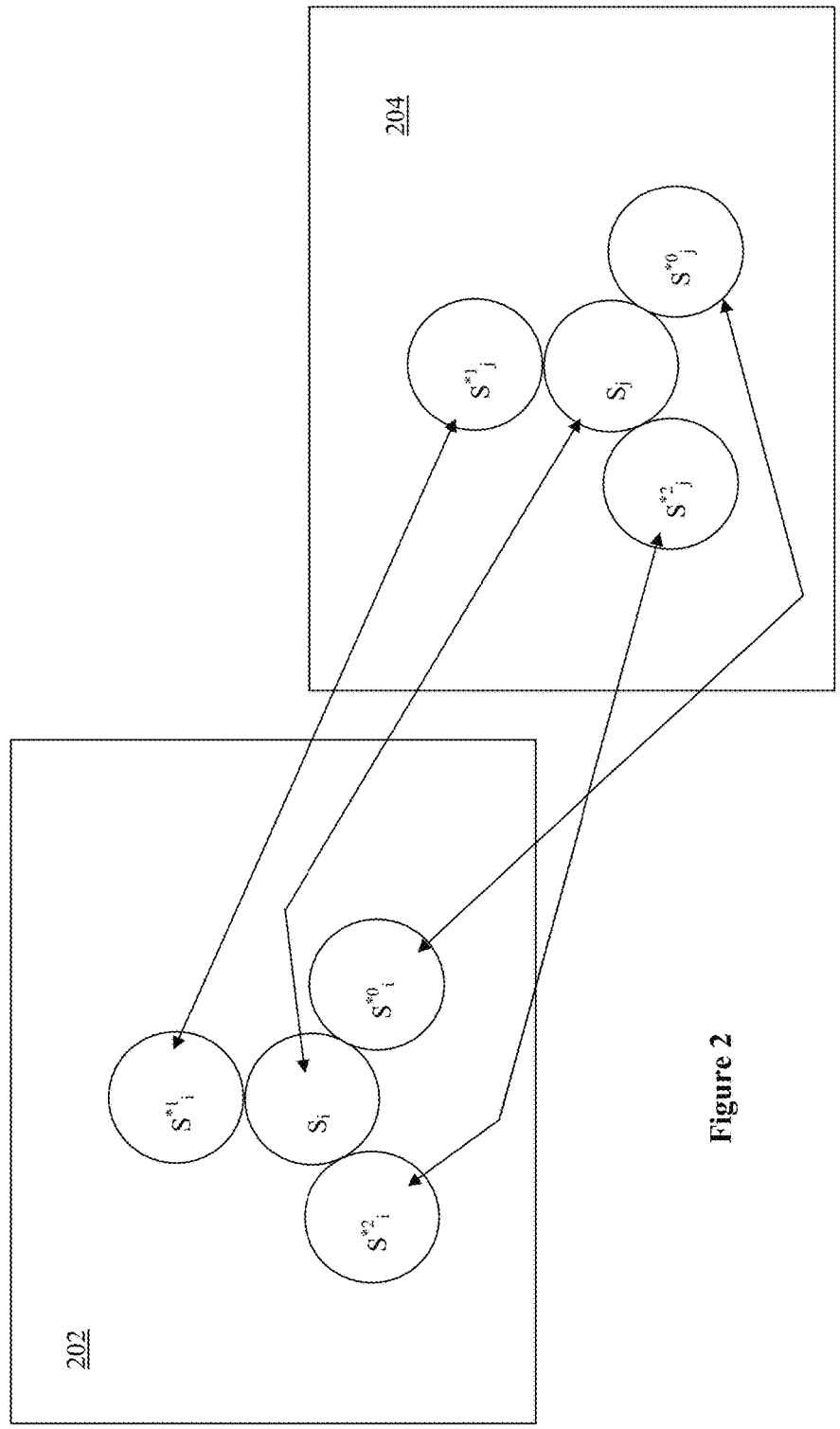
FIG. 2 illustrates the concepts of adjoin features in further detail, in accordance with various embodiments.

Referring now to FIG. 2, which illustrates the concept of adjoin features in further detail, in accordance with various embodiments. As illustrated, in embodiments, during object detection, for keypoint features $S_i$ and $S_j$ of images 202 and 204, Image Object Detection Service 132 may generate additional adjoin features $S^{*k}_i$ and $S^{*k}_j$ surrounding keypoint features $S_i$ and $S_j$, k=0, 1, . . . K−1. K may be any integer greater than or equal to 1. For the illustration, K=3. In embodiments, Image Object Detection Service 132 may determine whether keypoint features $S_i$ and $S_j$ are similar, based at least in part on whether the adjoin features $S^{*k}_i$ and $S^{*k}_j$ are determined to be similar or not. As those skilled in the art may appreciate, the adjoin features effectively encode local spatial relationship of the keypoints. Adjoin features can be more discriminative than an individual keypoint feature for object detection.

Figure 3:
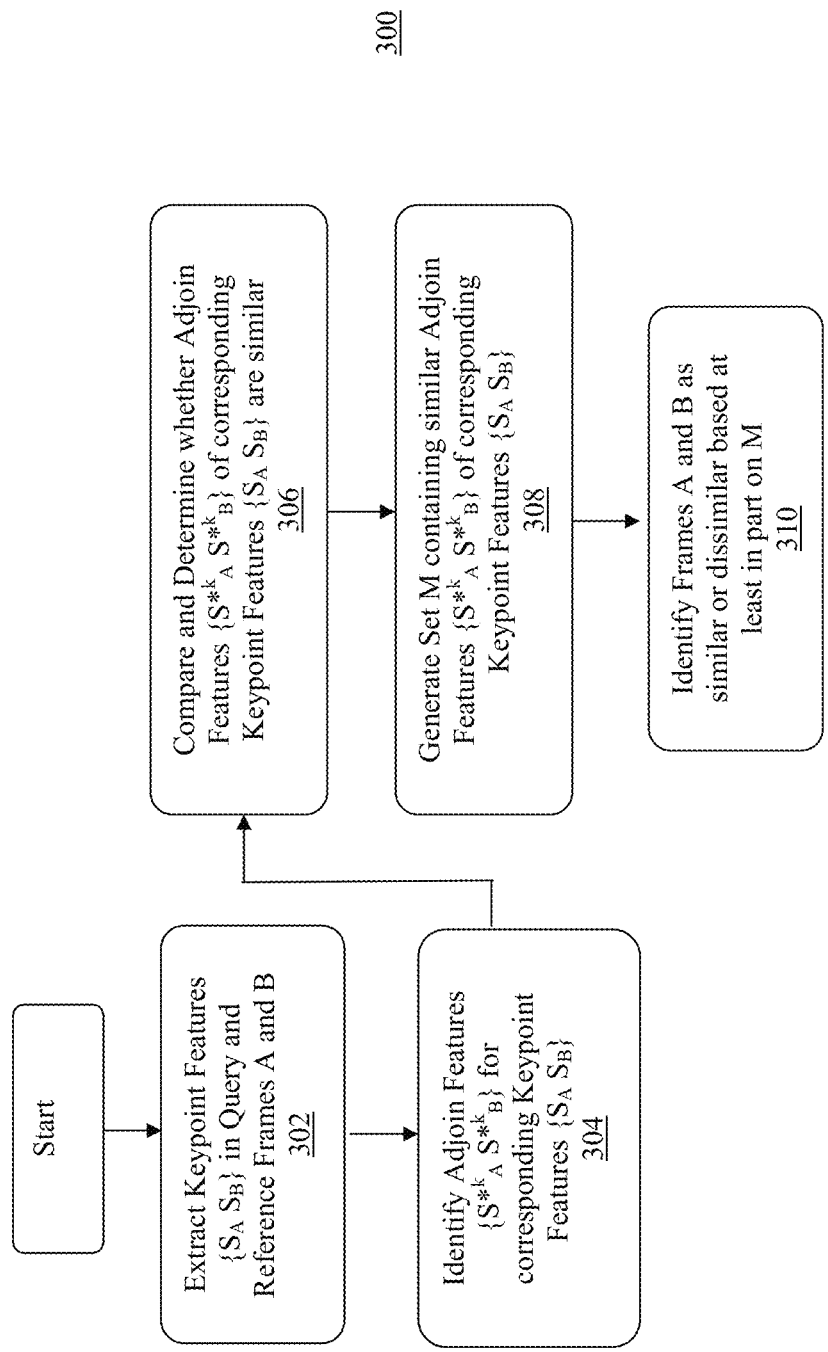
FIG. 3 illustrates an example process for adjoin features based object detection, in accordance with various embodiments.

Referring now also to FIG. 3, which illustrates an example process for adjoin feature based object detection, in accordance with various embodiments. For ease of understanding, adjoin feature based object detection process 300 will be described in terms of a number of operations. In implementations, one or more hardware and/or software components may be employed to perform the operations. As shown, in embodiments, process 300 may start at block 302. At block 302, Image Object Detection Service (IODS) 132 may extract keypoint features $\{S_A\ S_B\}$ in a query image A and a reference image B. The keypoint features may be extracted in accordance with any one of a number of keypoint feature extraction techniques known in the art. In embodiments, for each image A or B, the extracted keypoint features $s_i$ may be defined by the parameters $[X_i, r_i, \theta_i, f(X_i, r_i, \theta_i)]^T$, where, $X_i \in R^2$ is a keypoint feature position, $r_i$ is the keypoint feature size, $\theta_i$ is the keypoint feature orientation, and $f(X_i, r_i, \theta_i)$ is the corresponding keypoint feature descriptor. {T denotes vector transpose, and R denotes real numbers.}

In embodiments, reference image B may be one of a number candidate images preliminarily selected from images 142. The candidate images may be preliminarily selected by, e.g., fast approximate nearest neighbor searching technique, such as, kd tree indexing, hierarchical clustering, vocabulary tree, and so forth.

From block 302, process 300 may proceed to block 304. At block 304, IODS 132 may identify the adjoin features for the extracted keypoint features $s_i$. In embodiments, given a keypoint feature $s_i = [X_i, r_i, \theta_i, f(X_i, r_i, \theta_i)]^T$, the K adjoin features of $s_i$ may be identified as $s_i^{*k} = [X_i^{*k}, r_i, \theta_i, f(X_i^{*k}, r_i, \theta_i)]^T$ where $X_i^{*k} = X_i + 2\ r_i[\cos(a_k), \sin(a_k)]^T$, $a_k = \theta_i + 2\pi k/K$, $k=1, 2, \ldots K-1$, and K is an adjoin feature order. As shown in FIG. 2, in embodiments, adjoin feature $s_i^{*k}$, $k=1, 2 \ldots K-1$ may be a group of symmetrical points around the keypoint $s_i$. The adjoin features may have same point size $r_i$ and orientation $\theta_i$ as the keypoint $s_i$, but have different point positions. The symmetrically distributed adjoin feature descriptors $f(X_i^{*k}, r_i, \theta_i)$ may encode the local spatial relationships of keypoint $s_i$. Thus, in embodiments, the adjoin feature $s_i^{*k}$ may be invariant to the change of image rotation, shift and scale, since they depend on the scale-shift-rotation invariant of keypoint $s_i$. This property may be especially prominent for keypoint features with robust principle orientation and size. As will be appreciated by those skilled in the art, the invariance of adjoin features may be advantageous for adjoin feature matching. In the process of adjoin features extraction, the time of adjoin keypoint detection may be saved, thus, the computational cost may mainly come from feature descriptor extraction.

Since the adjoin feature naturally encodes the local spatial relationship with invariant scale-shift-rotation, in embodiments, the discriminative power of a keypoint feature may be increased through employment of the spatial relationship constraint of the adjoin features. Therefore, if a pair of keypoint features $<s_i, s_j>$ is correctly matched, their accompanied adjoin features $<s_i^{k*}, s_j^{k*}>$ should be matched too. On the contrary, a matched adjoin feature pair $<s_i^{k*}, s_j^{k*}>$ can verify and filter the pair of keypoints $<s_i, s_j>$. Still referring to FIG. 3, from block 304, process 300 may proceed to block 306.

At block 306, IODS 132 may compare and determine whether adjoin features $\{S_A^{*k}\ S_B^{*k}\}$ of corresponding keypoint features $\{S_A\ S_B\}$ are similar. In embodiments, from block 306, process 300 may proceed to block 308, where IODS 132 may generate a set M containing similar adjoin features $\{S_A^{*k}\ S_B^{*k}\}$ of corresponding keypoint features $\{S_A\ S_B\}$, based on a result of the determination operations performed in block 306. For example, IODS 132 may include a pair of keypoint features $<s_i, s_j>$ as a member of set M, if at least one pair of their corresponding adjoin features $<s_i^{*k}, s_j^{*k}>$ are determined to be similar. In embodiments, from block 308, process 300 may proceed to block 310, where IODS 132 may identify whether query frame A and reference frame B as similar or dissimilar, based at least in part on the set M generated in block 308. For example, IODS 132 may identify query frame A and reference frame B as similar if the size of set M exceeds a threshold.

In embodiments, IODS 132 may also identify common objects in the images, based at least in part on the content of set M. Further, IODS 132 may also generate a geometric primitive, such as a rectangular box, to bound the object detected in both frames to highlight the object.

In embodiments, the generation of set M may be performed algorithmically as follows:

---

Input: Key point features set $S_A=\{s_i\}$, $S_B=\{s_j\}$, adjoin feature order K, adjoin features $S^{*k}_A$ of $S_A$, adjoin features $S^{*k}_B$ of $S_B$, and the number N for KNN search
Output: Matching point pairs set $M=\{<s_i, s_j>, s_i \in S_A, s_j \in S_B\} \in$
1: $M=\{\ \}$
2: for each $s_i \in S_A$ do
3:  find N nearest points $s_j$ from $S_B$, j=1,2,...N
4:  for k=0 to K-1 do
5:   verify adjoin feature $s^{*k}_i$ is similar to $s^{*k}_j$,j=1...N
    (or efficiently verify adjoin feature $s^{*k}_i$ is in N nearest neighbor of $s^{*k}_j$, j=1,...N)
6:  end for
7:  if at least one of $<s^{*k}_i, s^{*k}_j>$ are similar then
8:   $M=M \cup \{<s_i, s_j>\}$
13:  end if
14: end for

---

By embedding the local spatial constraint, the adjoin feature matching may significantly reduce the number of false positive point matching. Exemplary advantages may be summarized as follows:

High-efficiency. Adjoin feature matching efficiently encodes the local spatial constraint with computation complexity of O(n) where n is the number of keypoint features. Compared with existing edgelet and/or trianglet based approaches, adjoin feature matching may be more efficient without the shortcoming of the explosion of keypoint feature combination, e.g., computing $O(n^2)$ for edgelet and $O(n^3)$ for trianglet.

Scalability. Adjoin feature matching may provide an extensible framework to enhance the traditional keypoint feature matching. In embodiments, the default value of adjoin feature order K may be set to 1. However, K may be set to higher to encode more complex spatial constraints to increase the robust performance.

In embodiments, process 300 may be repeated multiple times in sequence or in parallel for multiple reference images for each query image, until a match is found, until a threshold number of matches are found, or until any one of a number of termination criteria is met, such as exhaustion of time and/or computing resources allocated.

Referring now briefly back to FIG. 1, in embodiments, in addition to IODS 132, image processing services 122 may further include Image Object Bilateral Symmetric Segmentation Function (IOBSSF) 136.

Figure 4:
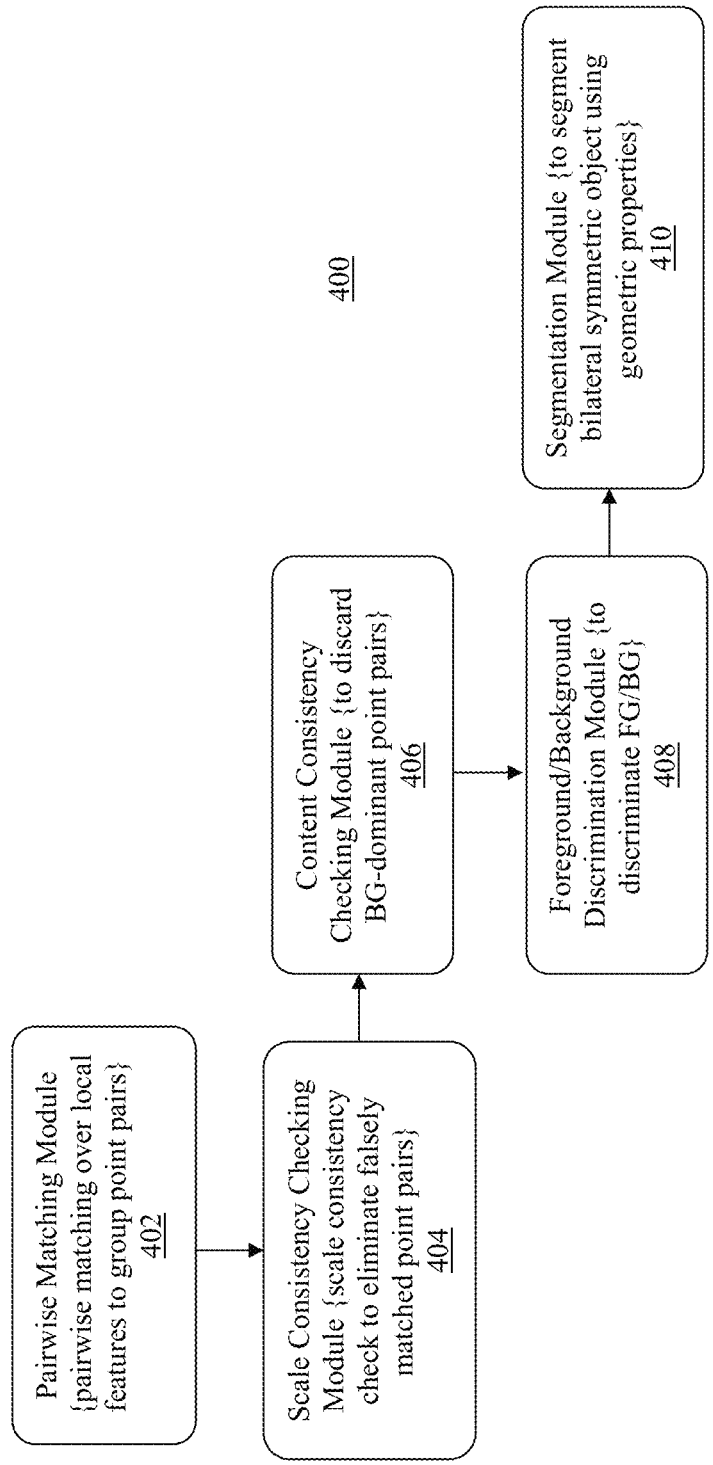
FIG. 4 illustrates an example process for bilateral symmetric object segmentation, suitable for use in object classification, in accordance with various embodiments.

Referring now to FIG. 4, which illustrates an example process for bilateral symmetric object segmentation, in accordance with various embodiments. For ease of understanding, bilateral symmetric object segmentation process 400 will be described in terms of a number of operations. In implementations, one or more hardware and/or software components may be employed to perform the operations. As shown, in embodiments, process 400 may start at block 402. At block 402, IOBSSF 136, e.g., using a pairwise matching module, may perform pairwise matching over local features to group point pairs of an image.

Figure 5:
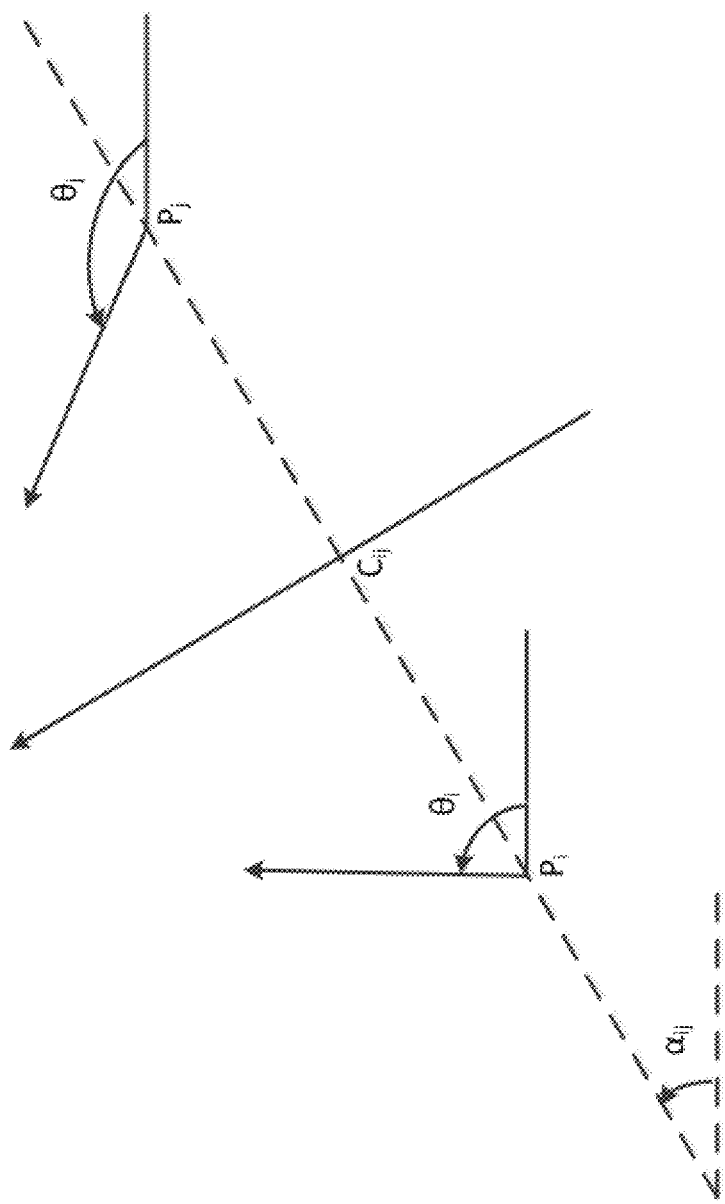
FIG. 5 illustrates the concept of bilateral symmetry in further detail, in accordance with various embodiments.

The basic problem of bilateral symmetry detection may be considered as a problem to identify local image region pairs which are sufficiently similar when flipping them about respective axes. The problem is challenging not only because there are many parameters needed to be accurately determined but also because there can be significant variations in images due to changing illuminations, backgrounds and/or distortions. In embodiments, IOBSSF 136 may address the problem from the perspective of grouping point pairs through matching local features. Consider $(x_i, y_i, \theta_i, s_i, f_i)$ and $(x_j, y_j, \theta_j, s_j, f_j)$ as two sets containing the image coordinates, orientations, scales and local feature vectors of point $P_i$ and point $P_j$, respectively, $\alpha_{ij}$ be the angle of the line segment connecting point $P_i$ and point $P_j$, $C_{ij}$ be the midpoint of this line segment. In mathematical notion, the feature orientations at point $P_i$ and point $P_j$ are strict bilateral symmetric if and only if $\theta_i + \theta_j - 2\alpha_{ij} = \pi$ as illustrated by illustration 500 of FIG. 5.

In embodiments, IOBSSF 136 may first obtain a collection matched point pairs. For example, given an image, IOBSSF 136 may:

(1) generate a keypoint set $\{P_1, P_2, \ldots, P_K\}$ and a corresponding feature set $\{(x_1, y_1, \theta_1, s_1, f_1), (x_2, y_2, \theta_2, s_2, f_2), \ldots, (x_K, y_K, \theta_K, s_K, f_K)\}$ using a specific keypoint detector and a related descriptor, such as SIFT (Scale-Invariant Feature Transform) and SURF (Speed Up Robust Features);

(2) generate a mirrored keypoint set $\{\hat{P}_1, \hat{P}_2, \ldots, \hat{P}_K\}$ and its feature set $\{(\hat{x}_1, \hat{y}_1, \hat{\theta}_1, \hat{s}_1, \hat{f}_1), (\hat{x}_2, \hat{y}_2, \hat{\theta}_2, \hat{s}_2, \hat{f}_2), \ldots, (\hat{x}_K, \hat{y}_K, \hat{\theta}_K, \hat{s}_K, \hat{f}_K)\}$, where $x_i = \hat{x}_i$, $y_i = \hat{y}_i$, $s_i = \hat{s}_i$;

(3) for each keypoint $P_i$ in $\{P_1, P_2, \ldots, P_K\}$, find its mirror $\hat{P}_j$ in $\{\hat{P}_1, \hat{P}_2, \ldots, \hat{P}_K\}$ by computing rank-1 nearest neighbor between $f_i$ and $\{\hat{f}_1, \hat{f}_2, \ldots, \hat{f}_K\}$.

Once a collection of K matched point pairs are obtained, IOBSSF 136 may use Eq. (1) below to measure the symmetry magnitude of each matched point pair $(P_i, \hat{P}_j)$.

$$M_{ij} = 1 - \cos(\theta_i + \hat{\theta}_j - 2\alpha_{ij}), \quad (1)$$

On taking the measurements, IOBSSF 136 may discard any point pair with $M_{ij}$ less than $t_m$.

From block 402, process 400 may proceed to block 404. At block 404, IOBSSF 136, using, e.g., a scale consistency checking module, may perform scale consistency check on the grouped point pairs to eliminate falsely matched point pairs. In embodiments, IOBSSF 136 may use Eq. (2) to compute scale ratio $r_s$ to evaluate the scale consistency of each matched point pair $(P_i, \hat{P}_j)$.

$$r_s = \frac{\min(s_i, \hat{s}_j)}{\max(s_i, \hat{s}_j)}. \quad (2)$$

On computing the scale ratios, IOBSSF 136 may discard point pair with $r_s$ less than threshold $t_s$.

From block 404, process 400 may proceed to block 406. At block 404, IOBSSF 136, using, e.g., a content consistency checking module, may perform content consistency check on the grouped point pairs to discard dominant point pairs. In embodiments, IOBSSF 136, may first use linear Hough transform to group matched point pairs sharing with the same bilateral symmetry axis. In embodiments, for a matched point pair $(P_i, \hat{P}_j)$, IOBSSF 136 may represent the reflective axis as $$\rho_{ij} = x_c \cos(a_{ij}) + y_c \sin(a_{ij}), \quad (3)$$

where $(x_c, y_c)$ are the image centered coordinates of the midpoint of the line segment connecting point $P_i$ and its mirror $\hat{P}_j$, $\alpha_{ij}$ is the angle of this line segment and it is computed from $$\alpha_{ij} = \arctan\left(\frac{\hat{y}_j - y_i}{\hat{x}_j - x_i}\right). \quad (4)$$

According to linear Hough transform, each matched point pair $(P_i, \hat{P}_j)$ casts a vote weighted by its symmetry magnitude $M_{ij}$ in $(\rho_{ij}, \alpha_{ij})$ space. After accumulating the votes, the global dominant bilateral symmetry group can be identified by finding the maximum in $(\rho_{ij}, \alpha_{ij})$ space. Multiple local dominant bilateral symmetry groups can also be determined by finding multiple maxima. The described approach is applicable for both global and local dominant bilateral symmetry groups.

In practice, although most of the point pairs in the dominant group are usually in the target region, there can be some point pairs positioned in the background region. In embodiments, IOBSSF 136 may evaluate whether two local image regions centered at a dominant point pair are sufficiently similar in content or not. Given a dominant point pair $(P_i, \hat{P}_j)$, let $R(P_i)$ and $R(\hat{P}_j)$ be the two circular image regions of N pixels centered at point $P_i$ and point $\hat{P}_j$, respectively, IOBSSF 136 may measure the content consistency by summing up $L_1$ formed color differences over pixel pairs in $R(P_i)$ and $R(\hat{P}_j)$, using Eq. (5) below. $I(R_{xy}(P_i))$ and $I(R_{xy}(\hat{P}_j))$ denote the RGB color values of two paired pixels at $R_{xy}(P_i)$ and $R_{xy}(\hat{P}_j)$, respectively.

$$d_{ij} = \frac{1}{N} \sum_{xy} \left\| I(R_{xy}(P_i)) - I(R_{xy}(\hat{P}_j)) \right\|_1. \quad (5)$$

In embodiments, IOBSSF 136 may discard any point pair with $d_{ij}$ larger than threshold $t_c$. IOBSSF 136 may also eliminate any point pair whose $d_{ij}$ is significantly different from those of other point pairs in the same group. Whether the difference amounts to "significantly different" may be application dependent.

Still referring to FIG. 4, from block 406, process 400 may proceed to blocks 408 and 410. At blocks 408 and 410, IOBSSF 136, using, e.g., a foreground/background discrimination module may discriminate the foreground (FG) and background (BG) of the image, and using, e.g., a segmentation module, may segment a bilateral symmetric object using geometric properties. In general, the dominant point pairs are usually within the textured part of object region. In other words, the precise object position is unknown. In embodiments, IOBSSF 136 may take the positions of dominant point pairs as the priors, and address the problem from the perspective of foreground segmentation. IOBSSF 136 may jointly use discriminative foreground/background modeling and geometric properties to accurately locate and segment a bilateral symmetric object.

The operations may be considered as having six major parts. In part 1, IOBSSF 136 may obtain a rectangular image region compactly including dominant point pairs. The rectangular image region may be considered as the initial foreground region (i.e., object region), and the outer margin containing the remained pixels may be considered as the background. Based on the feature values of the pixels in the foreground and background, in part 2, IOBSSF 136 may focus on constructing discriminative models of foreground and background. In embodiments, IOBSSF 136 may choose multiple discriminative features from a set of candidate features generated from linear combinations of RGB pixel values. Histogram feature may be used to represent foreground and background due to its robustness and efficiency. Given a set of M candidate features denoted as $$\{(w_{11}R+w_{12}G+w_{13}B), (w_{21}R+w_{22}G+w_{23}B), \ldots, (w_{M1}R+w_{M2}G+w_{M3}B)\}, \text{ and}$$

let $h_f$ and $h_g$ be the histogram models of foreground and background computed from one candidate feature, IOBSSF 136 may measure the capability of this feature to separate foreground and background by $$sep_i = \frac{v(L, (h_f + h_g)/2)}{v(L, h_f) + v(L, h_g)}, \tag{6}$$

where $$v(L, h) = \sum_i h(i)L^2(i) - \left(\sum_i h(i)L(i)\right)^2, \tag{7}$$

where $$L(i) = \log\frac{h_f(i)}{h_g(i)}. \tag{8}$$

In embodiments, IOBSSF 136 may combine the features with largest 3 $sep_i$ values to generate histogram models of foreground and background.

In part 3, IOBSSF 136 may segment the image based on the class-conditional distributions of feature values. As a result, a binary image may be obtained. In part 4, IOBSSF 136 may use particular morphological operations to eliminate noises in the binary image. In part 5, IOBSSF 136 may label the connected component sharing the largest overlap with the initial foreground region as the segmented object. In part 6, the accurate object region may be located by mirroring segmented object around its bilateral symmetry.

Referring now briefly back to FIG. 1, in embodiments, in addition to IODS 132 and IOBSSF 136, image processing services 122 may further include Image Object Classification Service (IOCS) 134.

Figure 6:
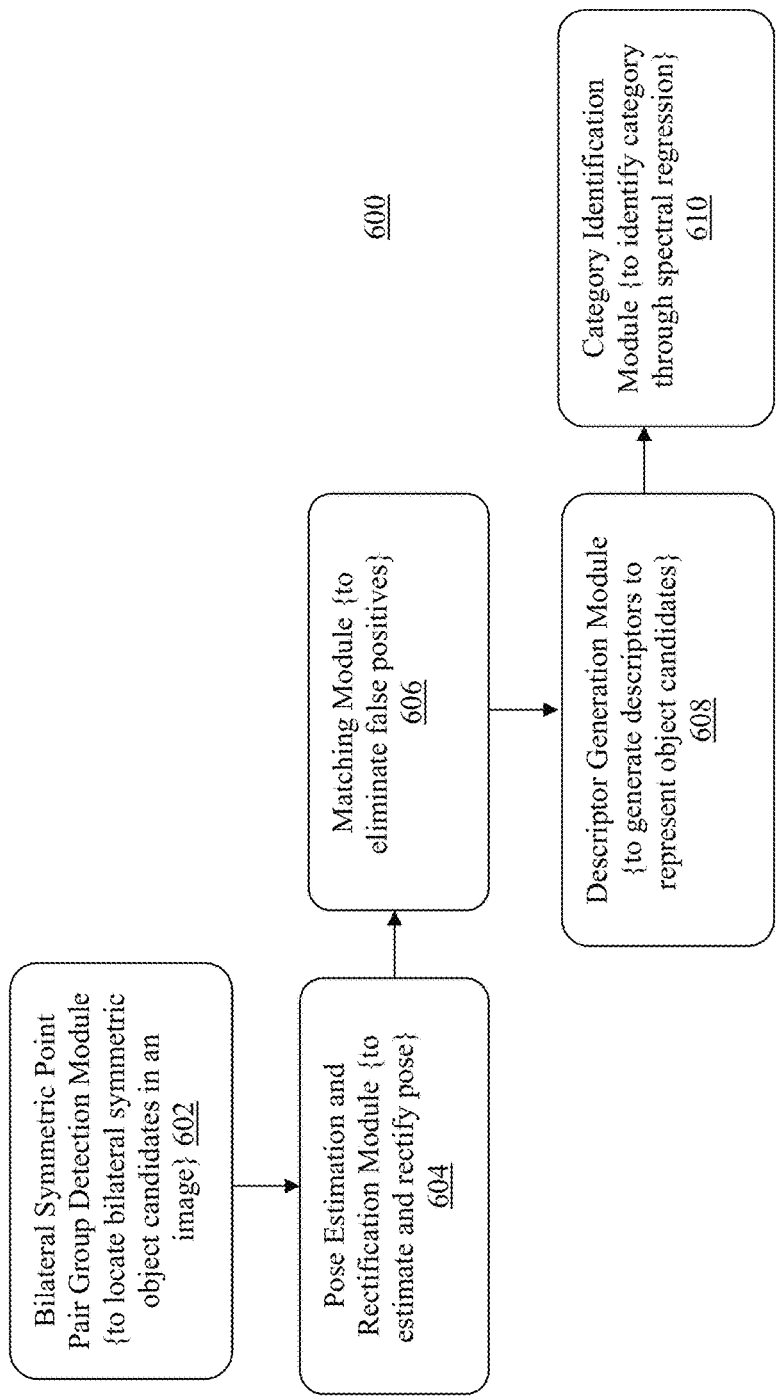
FIG. 6 illustrates an example process for classifying butterfly, in accordance with various embodiments.

Referring now to FIG. 6, which illustrates an example process for classifying a bilateral symmetric object, in accordance with various embodiments. For ease of understanding, classification process 600 will be described in terms of a number of operations. In implementations, one or more hardware and/or software components may be employed to perform the operations. As shown, in embodiments, process 600 may start at block 602. At block 602, IOCS 134, using, e.g., a bilateral symmetric point pair group detection module, may process an image, and locate bilateral symmetric object candidates, such as butterflies, in the image. In various applications, an image may include objects with distinct bilateral symmetry patterns. For example, from a top-view, butterfly bodies from different species typically demonstrate intrinsically distinct bilateral symmetry patterns. In embodiments, the bilateral symmetric point pair group detection module may invoke the earlier described IOBSSF 136 to locate bilateral symmetric object candidates in the image. When invoked, IOBSSF 136 may 1) group and identify global dominant point pairs sharing with the same reflective axis using pairwise matching over local features; 2) classify and discard any falsely matched dominant point pairs within the background; 3) infer initial object region; 4) discriminative feature selection for foreground and background modeling; 5) image segmentation and filtering; and 6) locate accurate object position using geometric properties, as earlier described.

From block 602, process 600 may proceed to block 604. At 604, IOCS 134, using, e.g., a pose estimation and rectification module, may estimate and rectify poses of the bilateral symmetric object candidates. Often, object candidates in images may not be captured from views that clearly exhibit their bilateral symmetry. Thus, to achieve robust fine-grained recognition, IOCS 134 may first estimate the object pose and then rectify the estimated pose. The orientation of each detected bilateral symmetric object candidate should directly correlate with the angle θ of its reflective axis, thus accurate pose rectification can be done relatively easy via rotating each detected object candidate {θ−90, if θ>90|θ+90, if θ≤90} degrees clockwise or {270−θ, if θ>90|90−θ, if θ≤90} degrees counterclockwise around its reflective axis.

From block 604, process 600 may proceed to block 606. At block 606, IOCS 134, using, e.g., a matching module, may eliminate false positives. IOCS 134, may eliminate the false positives by using a template based matching method. For example, let X and $\hat{X}$ be the co-occurrence histograms of oriented gradients (COHOG) descriptors concerning the clockwise and counterclockwise rotated images of a detected bilateral symmetric object candidate of interest, respectively. Further, let $\{T_i\}$ be a set of COHOG descriptors concerning the template images of K object classes. IOCS 134, may identify an object candidate as a true positive or false positive, in accordance with the following rules:

$$\begin{cases} \text{true,} & \text{if } \min\left(\min_{i=1,\ldots,K}(\|X - T_i\|_2), \min_{i=1,\ldots,K}(\|\hat{X} - T_i\|_2)\right) < d_t \\ \text{false,} & \text{otherwise} \end{cases} \tag{9}$$

where $d_t$ is a threshold.

For classifying butterflies, COHOG descriptors may be eye-spot-and-strip weighted (ESSW) COHOG descriptors.

Subtle differences between closely correlated subordinate categories may be important for fine-grained object recognition. Different sub-categories or species of the bilateral symmetric objects can be effectively identified via the distinct distributions of the COHOG descriptor, in particular, ESSW-COHOG descriptors in the case of fine-grained recognition of butterfly species. Thus, in embodiments, from block 606, process 600 may proceed to block 608. At block 608, IOCS 134, using, e.g., a descriptor generation module, may generate descriptors to represent the object candidates. COHOG may be considered a feature descriptor which expresses the object region as a statistical distribution of pairwise gradient orientations with various positional offsets. Mathematically, a COHOG H defined over the gradient orientations of a grayscale w×h image I can be expressed as $$H(i, j) = \sum_{x=1}^{w} \sum_{y=1}^{h} \begin{cases} 1, & \text{if } I_{igo}(x, y) = i \text{ and } I_{igo}(x + \Delta x, y + \Delta y) = j \\ 0, & \text{otherwise} \end{cases}, \quad (10)$$

where $I_{igo}$ is the indexed gradient orientation image of I and ($\Delta x$, $\Delta y$) is a positional offset.

In embodiments, in lieu of computing COHOG as using Eq. (10) in which each gradient orientation pair at a specific positional offset has the same vote, IOCS 134 may include a weighing procedure to enhance the importance of the gradient orientation pairs related to COHOG, while decrease the importance of the other pairs. In embodiments, scale invariant feature transform (SIFT) keypoints detected in images may correlate strongly with COHOG. Therefore, in embodiments, IOCS 134 may obtain the weight function from a statistical analysis of the orientations of the SIFT keypoints detected over the training images. The implementation may be summarized as follows:

---

Input: a pattern based weight vector W, an offset set $\{(\Delta x, \Delta y)\}$, and a gray image I.
1. For image I, compute a gradient orientation image $I_{go}$ and its index image $I_{igo}$.
2. Divide image I into N non-overlapped rectangular regions of same size.
3. Initialize SESW-COHOG descriptor H ← 0.
4. For every pixel at image position (x,y), do
    n ← the index No. of the divided rectangular image region including (x,y)
    i ← $I_{igo}$(x,y)
    For every positional offset($\Delta x$,$\Delta y$), do
        If (x + $\Delta x$, y + $\Delta y$) is located in the image I, then
            j ← $I_{igo}$(x + $\Delta x$, y + $\Delta y$)
            k ← the index No. of offset ($\Delta x$,$\Delta y$)
            H(n,i,j,k) ← H(n,i,j,k)+ W($I_{igo}$(x,y))× W($I_{igo}$(x + $\Delta x$, y + $\Delta y$))
        End if
    End for
End for
Output: SESW-COHOG descriptor H.

---

Figure 7:
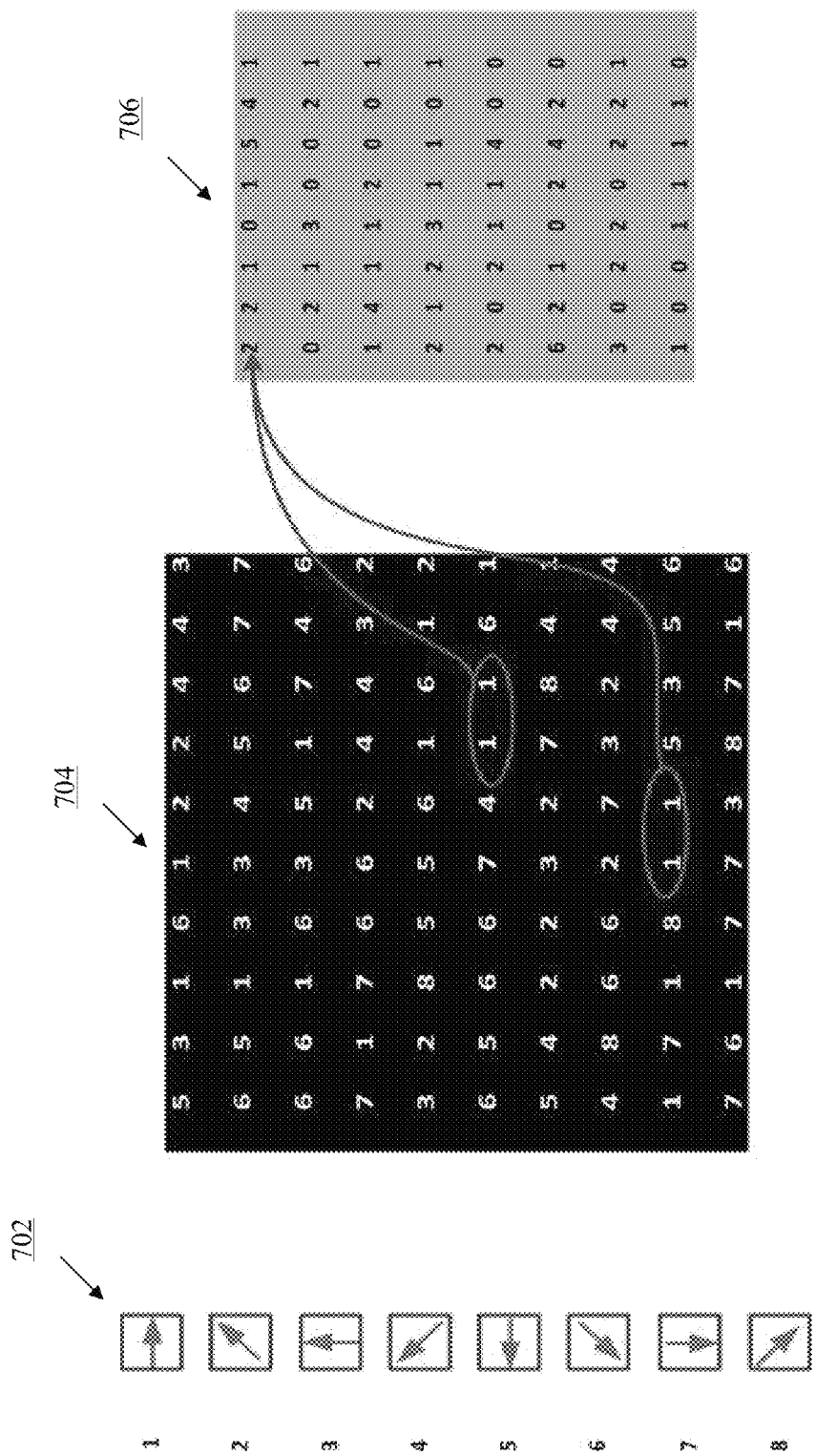
FIG. 7 illustrates the concept of indices of gradient orientations and usage in further detail, in accordance with various embodiments.

Referring briefly to FIG. 7, which illustrates the concept of indices of gradient orientations and usage in further detail, in accordance with various embodiments. As shown, the indices of gradient orientations 702 may be vectorized, e.g., into 8 intervals. 704 illustrates an example indexed gradient orientation image. 706 illustrates the COHOG matrix with a positional offset of($\Delta x$=1, $\Delta y$=0).

Referring back to FIG. 6, from block 608, process 600 may proceed to block 610. At block 610, IOCS 134, using, e.g., a category identification module, may identify the sub-category of a bilateral symmetric object candidate based at least in part on the descriptors generated through the operation of block 608.

In embodiments, IOCS 134 may employ a spectral regression based method for fine-grained bilateral symmetric object sub-category recognition. For example, let T be a training dataset containing P normalized images from K classes. Further, let $p_k$ be the number of the training images for the $k^{th}$ class, $I_t$ be a testing image, IOCS 134 may determine the sub-category of a bilateral symmetric object through spectral regression as follow:
1. Compute the COHOG descriptors (with dimension M) for all training bilateral symmetric objet images and the testing image, to obtain a training descriptor set $x_1$, $x_2$, ..., $x_P$ and a testing descriptor $x_t$.

2. Let $$y_k = \left[ \underbrace{0, \ldots, 0}_{\sum_{i=1}^{k-1} p_i}, \underbrace{1, \ldots, 1}_{p_k}, \underbrace{0, \ldots, 0}_{\sum_{i=k+1}^{K} p_i} \right]^T_{1 \times P},$$

where k=1, ..., K and $y_0$=[1, 1, ..., 1]$_{1 \times P}^T$, find K–1 basis vectors $\{v_k\}$ by solving $$v_k = \underset{v}{\operatorname{argmin}} \left( \sum_{p=1}^{P} (v^T x_p - y_k(p))^2 + \alpha \|v\|_2^2 \right), \quad (11)$$

where $\alpha$>0, $v_k \in R^M$, $y_k$(p) is the $p^{th}$ element of the Gram-Schmidt orthogonalized vector of $y_k$.
3. Embed each training vector $x_p$ into the K–1 dimensional subspace according to $$z_p = V^T \begin{bmatrix} x_p \\ 1 \end{bmatrix}, V = \begin{bmatrix} v_1, & v_2, & \ldots, & v_{K-1} \\ 1, & 1, & \ldots, & 1 \end{bmatrix}, \quad (12)$$

4. Repeat operation #3 on the testing vector $x_t$, to obtain a testing embedding z.
5. Compute and group $L_2$ formed distance between the testing embedding z and each training embedding $z_p$, and take the class of the training embedding with the minimum distance to classify the testing image.

Figure 8:
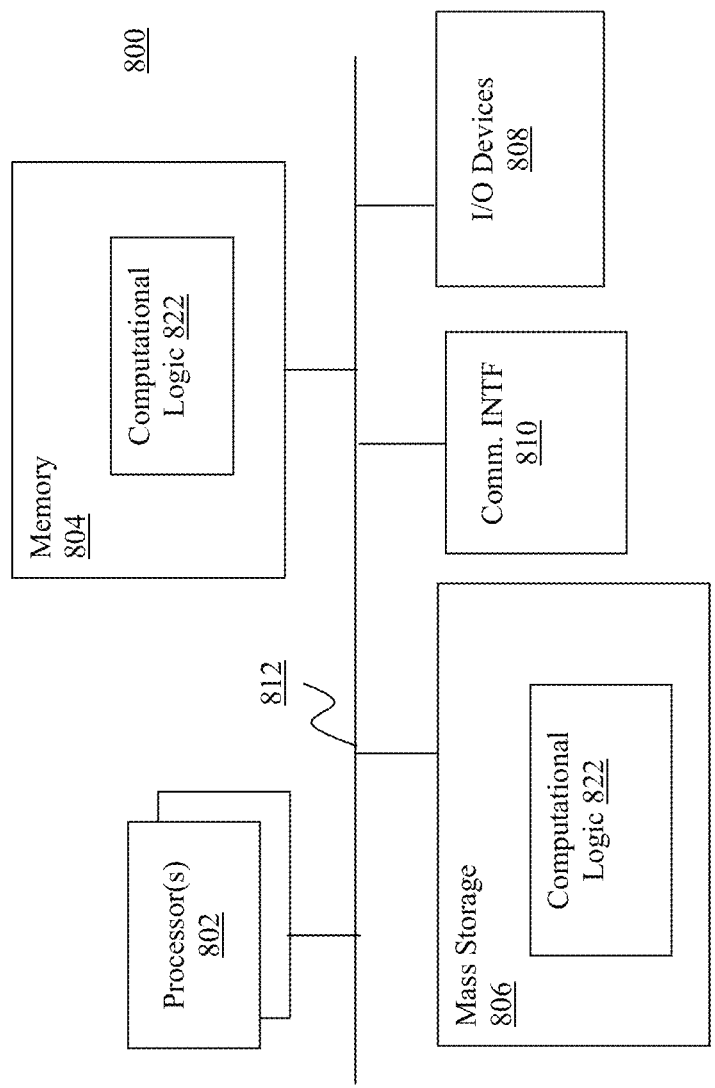
FIG. 8 illustrates an example computing system suitable for practicing the present disclosure, in accordance with various embodiments.

Referring now to FIG. 8, wherein an example computer suitable for use for the arrangement of FIG. 1, in accordance with various embodiments, is illustrated. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing the operations associated with IODS 132, IOCS 134 and/or IOBSSF 136 of FIG. 1, earlier described. The various elements may be implemented by assembler instructions supported by processor(s) 802 or high-level languages, such as, for example, C, that can be compiled into such instructions.

The persistent copy of the programming instructions may be placed into persistent mass storage devices 806 in the factory, or in the field, through, for example, a distribution medium (not shown), such as a compact disc (CD), or through communication interface 810 (from a distribution server (not shown)). That is, one or more distribution media having an implementation of the agent program may be employed to distribute the agent and program various computing devices.

The number, capability and/or capacity of these elements 810-812 may vary, depending on the intended use of example computer 800, e.g., whether example computer 800 is a stationary computing device like a set-top box or a desktop computer, or a mobile computing device, like a smartphone, tablet, ultrabook or laptop. The constitutions of these elements 810-812 are otherwise known, and accordingly will not be further described.

Figure 9:
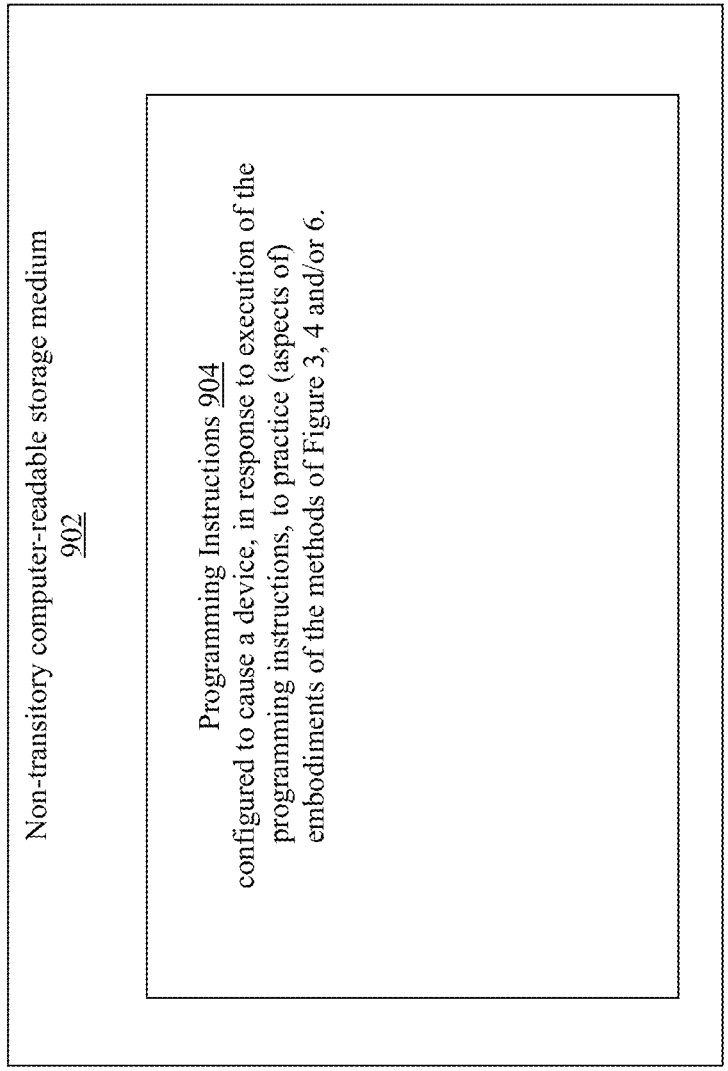
FIG. 9 illustrates an example storage medium with instructions configured to enable an apparatus to practice various aspects of the present disclosure, in accordance with various embodiments.

FIG. 9 illustrates an example non-transitory computer-readable storage medium having instructions configured to practice all or selected ones of the operations associated with IODS 132, IOCS 134 and/or IOBSSF 136 of FIG. 1, earlier described; in accordance with various embodiments. As illustrated, non-transitory computer-readable storage medium 902 may include a number of programming instructions 904. Programming instructions 904 may be configured to enable a device, e.g., computer 800, in response to execution of the programming instructions, to perform, e.g., various operations of processes 300, 400 and/or 600 of FIGS. 3, 4 and/or 6. In alternate embodiments, programming instructions 904 may be disposed on multiple non-transitory computer-readable storage media 902 instead.

Referring back to FIG. 8, for one embodiment, at least one of processors 802 may be packaged together with computational logic 822 (in lieu of storing in memory 804 and/or mass storage device 806) configured to practice aspects of the process(es) of FIGS. 3, 4 and/or 6. For one embodiment, at least one of processors 802 may be packaged together with computational logic 822 configured to practice aspects of the process(es) of FIGS. 3, 4 and/or 6 to form a System in Package (SiP). For one embodiment, at least one of processors 802 may be integrated on the same die with computational logic 822 configured to practice aspects of the process(es) of FIGS. 3, 4 and/or 6. For one embodiment, at least one of processors 802 may be packaged together with computational logic 822 configured to practice aspects of the process(es) of FIGS. 3, 4 and/or 6 to form a System on Chip (SoC). For at least one embodiment, the SoC may be utilized in, e.g., but not limited to, a computing tablet.

Thus, example embodiments described include, but are not limited to:

Example 1 may be a method for processing one or more images, where the method may include generating, by a computing device, a plurality of pairs of keypoint features, with each pair of keypoint features including a first keypoint feature from a first of the one or more images, and a second keypoint feature from a second of the one or more images; and generating, by the computing device, for each pair of keypoint features, first one or more adjoin features for the first keypoint feature of the keypoint feature pair, and corresponding second one or more adjoin features for the second keypoint feature of the keypoint feature pair. The method may further include determining, by the computing device, for each pair of keypoint features, whether an adjoin feature of the first keypoint feature of the keypoint feature pair is similar to the corresponding adjoin feature of the second keypoint feature of the keypoint feature pair; and determining, by the computing device, whether the first and the second image have at least one similar object, based at least in part on a result of the determination of similarity between the corresponding adjoin features of the first and second keypoint features of the keypoint feature pairs.

Example 2 may be example 1, where generating a plurality of pairs of keypoint features may include identifying a first plurality of keypoint features of the first image; identifying a second plurality of keypoint features of the second image; and pairing the first and second plurality of keypoint features of the first and second images.

Example 3 may be example 1 or 2, where generating, for each pair of keypoint features, first one or more adjoin features for the first keypoint feature of the keypoint feature pair, and corresponding second one or more adjoin features for the second keypoint feature of the keypoint feature pair may include: for each pair of keypoint features, identifying the first one or more adjoin features for the first keypoint feature of the keypoint feature pair; and identifying the corresponding second one or more adjoin features for the second keypoint feature of the keypoint feature pair.

Example 4 may be any one of examples 1-3, where determining whether the first and the second image have at least one similar object may include: generating a set of similar keypoint feature pairs, wherein the keypoint features of a similar keypoint feature pair are determined to be similar based at least in part on a result of the determination of similarity between the corresponding adjoin features of the keypoint features of the similar keypoint feature pairs; and outputting the set of similar keypoint feature pairs.

Example 5 may be example 4, where the method may further include highlighting, by the computing device, at least an object in the first image based at least in part on some of the keypoint features of the first image that are members of the set of similar keypoint feature pairs.

Example 6 may be example 5, where highlighting may include bounding the object with a geometric primitive.

Example 7 may include an apparatus for processing one or more images, where the apparatus may include one or more processors; and at least one storage medium coupled to the one or more processors, and having instructions configured to cause the apparatus, in response to operation by the one or more processors, to implement an image object detection service that includes performance any one of the methods of examples 1-6.

Example 8 may be example 7 where the apparatus may be a selected one of a set-top box, a smartphone, a computing tablet, an ultrabook, a laptop computer, a desktop computer, a server computer, a game console, or a media player.

Example 9 may include at least one storage medium, where the storage medium may include a plurality of instructions, in response to execution by an apparatus, cause the apparatus to implement an image object detection service that includes performance of any one of the methods of examples 1-6.

Example 10 may include a method for processing one or more images, where the method may include: pairwise matching local features of an image, by a computing device, to generate an initial plurality of point pairs for the image; and scale consistency checking the point pairs, by the computing device, to eliminate falsely matched point pairs from the initial plurality of point pairs, resulting with a first intermediate plurality of scale consistency checked point pairs. The method may further include content consistency checking the first intermediate plurality of scale consistency checked point pairs, by the computing device, to discard dominant point pairs in background of the image, resulting in a second intermediate plurality of content consistency checked point pairs; discriminative foreground and background modeling of the image, by the computing device, based at least in part on the second intermediate plurality of content consistency checked point pairs; and segmenting, by the computing device, a bilateral symmetric object in the image based at least in part on geometric properties of the discriminative foreground and background modeled image.

Example 11 may be example 10, where pairwise matching may include detecting symmetry in the image; and generating symmetric constellations of features, wherein generating symmetric constellations of features includes generating two sets of points $\{P_i\}$ and $\{P_j\}$ that respectively include image coordinates, orientations, scales and local feature vectors of the points $\{P_i\}$ and $\{P_j\}$.

Example 12 may be example 10 or 11, where scale consistency checking may include computing a scale ratio for each point pair, and discarding a point pair if the scale ratio of a point pair is less than a threshold.

Example 13 may be any one of examples 10-12, where content consistency checking may include grouping matched point pairs that share a bilateral symmetry axis.

Example 14 may be any one of examples 10-13, where content consistency checking a point pair may include computing an average color difference for regions correspondingly comprising the points of the point pair, and discarding the point pair if the average color difference of the point pair is larger than a threshold.

Example 15 may be any one of examples 10-14, where discriminative foreground and background modeling of the image may include obtaining a rectangular region that bounds the dominant point pairs; temporarily designating the rectangular region as foreground of the image, and remainder of the image as background of the image; and generating a plurality of histograms to model features of the foreground and the background based at least in part on color values of pixels of the image.

Example 16 may be example 15, where segmenting may include obtaining a binary image based at least in part on the histograms; performing morphological operations to eliminate noises in the binary image; labeling connect components sharing largest overlap with the foreground as a segmented portion of the bilateral symmetric object; and mirroring the segmented portion across an axis to identify the other segmented portion of the bilateral symmetric object.

Example 17 may include an apparatus for processing one or more images, where the apparatus may include one or more processors; and at least one storage medium coupled to the one or more processors, and having instructions configured to cause the apparatus, in response to operation by the one or more processors, to implement an image object bilateral symmetric segmentation function that includes performance of any one of the methods of example 10-16.

Example 18 may be example 17, where the apparatus may be a selected one of a set-top box, a smartphone, a computing tablet, an ultrabook, a laptop computer, a desktop computer, a server computer, a game console, or a media player.

Example 19 may include at least one storage medium, where the storage medium may include a plurality of instructions, in response to execution by an apparatus, cause the apparatus to implement an image object bilateral symmetric segmentation function that includes performance of any one of the methods of examples 10-16.

Example 20 may include a method for processing one or more images, where the method may include detecting, by a computing device, bilateral symmetric point pair groups to locate a plurality of bilateral symmetric object candidates in an image; and identify, by the computing device, poses of the plurality of object candidates. The method may further include eliminating, by the computing devices, false positives of the object candidates, based at least in part on the poses, and a plurality of templates; generating, by the computing devices, descriptors representing remaining object candidates; and identifying, by the computing device, species of the remaining candidates through spectral regression, using the generated descriptors. Example 20a may be example 20, where the object candidates are butterfly candidates.

Example 21 may be example 20, where identifying poses may include estimating poses and rectifying estimated poses.

Example 22 may include an apparatus for processing one or more images, where the apparatus may include one or more processors; and at least one storage medium coupled to the one or more processors, and having instructions configured to cause the apparatus, in response to operation by the one or more processors, to implement an image object classification service that includes performance of any one of the methods of examples 20-21.

Example 23 may be example 22, where the apparatus may be a selected one of a set-top box, a smartphone, a computing tablet, an ultrabook, a laptop computer, a desktop computer, a server computer, a game console, or a media player.

Example 24 may include at least one or more storage medium, where the storage medium may include a plurality of instructions, in response to execution by an apparatus, cause the apparatus to implement an image object classification service that includes performance of any one of the methods of examples 20-21.

Example 25 may include an apparatus for processing one or more images, where the apparatus may include one or more processors; and at least one storage medium coupled to the one or more processors, and having instructions configured to cause the apparatus, in response to operation by the one or more processors, to perform one or more of the methods of examples 1-6, 10-16, and 20-21.

Example 26 may be example 25, where the apparatus may be a selected one of a set-top box, a smartphone, a computing tablet, an ultrabook, a laptop computer, a desktop computer, a server computer, a game console, or a media player.

Example 27 may include at least one storage medium, wherein the storage medium may include a plurality of instructions, in response to execution by an apparatus, cause the apparatus to perform one or more of the methods of examples 1-6, 10-16, and 20-21.

Example 28 may include means for performing any one of the methods of examples 1-6; and means for performing any one of the methods of examples 10-16, or 20-21.

Example 29 may include means for performing any one of the methods of examples 11-16; and means for performing any one of the methods of claims 20-21.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A method for processing one or more images, comprising:
generating, by a computing device, a plurality of pairs of keypoint features, with each pair of keypoint features including a first keypoint feature from a first of the one or more images, and a second keypoint feature from a second of the one or more images;
generating, by the computing device, for each pair of keypoint features, a first plurality of adjoin features for the first keypoint feature of the keypoint feature pair, and a corresponding second plurality of adjoin features for the second keypoint feature of the keypoint feature pair, wherein the first plurality of adjoin features for the first keypoint feature are immediately adjacent to and circularly surround the first keypoint feature, and the second plurality of adjoin features for the second keypoint feature are immediately adjacent to and circularly surround the second keypoint feature;
determining, by the computing device, for each pair of keypoint features, whether an immediately adjacent adjoin feature of the first keypoint feature of the keypoint feature pair is similar to the corresponding immediately adjacent adjoin feature of the second keypoint feature of the keypoint feature pair; and
determining, by the computing device, whether the first and the second image have at least one similar object, based at least in part on a result of the determination of similarity between the corresponding immediately adjacent and circularly surrounding adjoin features of the first and second keypoint features of the keypoint feature pairs;
wherein the first and second plurality of immediately adjacent and circularly surrounding adjoin features are generated based at least in part on an adjoin feature order; and wherein given a first keypoint feature of $s_i$ defined by at least $[X_i, r_i, \theta_i,]^T$, an adjoin feature order of K, the K immediately adjacent and circularly surrounding adjoin features of $s_i$ comprises $s_i^{*k}$ defined by at least $[X^{*k}_i, r_i, \theta_i,]^T$, where $X^{*k}_i$ is defined by at least $[X_i, r_i$ and $\alpha_k]$, where $\alpha_k=\theta_i+2\pi k/K$, k=1,2, ... K−1, $r_i$ and $\theta_i$ are point size and orientation of the keypoint feature $s_i$.

2. The method of claim 1, wherein generating a plurality of pairs of keypoint features comprises:
identifying a first plurality of keypoint features of the first image;
identifying a second plurality of keypoint features of the second image; and
pairing the first and second plurality of keypoint features of the first and second images.

3. The method of claim 1, wherein determining whether the first and second images have at least one similar object comprises:
generating a set of similar keypoint feature pairs, wherein the keypoint features of a similar keypoint feature pair are determined to be similar based at least in part on a result of the determination of similarity between the corresponding immediately adjacent and circularly surrounding adjoin features of the keypoint features of the similar keypoint feature pairs; and
outputting the set of similar keypoint feature pairs.

4. The method of claim 3, further comprising highlighting, by the computing device, at least an object in the first image based at least in part on some of the keypoint features of the first image that are members of the set of similar keypoint feature pairs.

5. The method of claim 4, wherein highlighting comprises bounding the object with a geometric primitive.

6. The method of claim 1, wherein the first and second plurality of immediately adjacent and circularly surrounding adjoin features are generated based at least in part on an adjoin feature order; and wherein given a first keypoint feature of $s_i=[X_i, r_i, \theta_i, f(X_i, r_i, \theta_i)]^T$, an adjoin feature order of K, the K immediately adjacent and circularly surrounding adjoin features of $s_i$ comprises $s_i^{*k}=[X_i^{*k},r_i,\theta_i,f(X_i^{*k},r_i,\theta)]^T$ where $X^{*k}_i=X_i+2r_i[\cos(\alpha_k), \sin(\alpha_k)]^T$, $\alpha_k=\theta_i+2\pi k/K$, k=1, 2, ... K−1, $r_i$ and $\theta_i$ are point size and orientation of the keypoint feature $s_i$, and $f(X^{*k}_i, r_i, \theta_i)$ comprises local spatial relationships of keypoint feature $s_i$.

7. At least one non-transitory storage medium comprising a plurality of instructions configured to cause an apparatus, in response to execution of the instructions by an apparatus, to perform processing of a plurality of images, wherein performance of the processing includes:
generation of a plurality of pairs of keypoint features, with each pair of keypoint features including a first keypoint feature from a first of the one or more images, and a second keypoint feature from a second of the one or more images;
for each pair of keypoint features, generation of a first plurality of adjoin features for the first keypoint feature of the keypoint feature pair, and a corresponding second plurality of adjoin features for the second keypoint feature of the keypoint feature pair, wherein the first plurality of adjoin features for the first keypoint feature are immediately adjacent and circularly surrounding the first keypoint feature, and the second plurality of adjoin features for the second keypoint feature are immediately adjacent and circularly surrounding the second keypoint feature;
for each pair of keypoint features, determination of whether an adjoin feature of the first keypoint feature of the keypoint feature pair is similar to the corresponding adjoin feature of the second keypoint feature of the keypoint feature pair; and
determination of whether the first and the second image have at least one similar object, based at least in part on a result of the determination of similarity between the corresponding immediately adjacent and circularly surrounding adjoin features of the first and second keypoint features of the keypoint feature pairs;
wherein the first and second plurality of immediately adjacent and circularly surrounding adjoin features are generated based at least in part on an adjoin feature order; and wherein given a first keypoint feature of $s_i$ defined by at least $[X_i, r_i, \theta_i,]^T$, an adjoin feature order of K, the K immediately adjacent and circularly surrounding adjoin features of $s_i$ comprises $s_i^{*k}$ defined by at least $[X^{*k}_i, r_i, \theta_i,]^T$, where $X^{*k}_i$ is defined by at least $[X_i, r_i$ and $\alpha_k]$, where $\alpha_k=\theta_i+2\pi k/K$, k=1,2, ...K−1, $r_i$ and $\theta_i$ are point size and orientation of the keypoint feature $s_i$.

8. The storage medium of claim 7, wherein generation of a plurality of pairs of keypoint features comprises:
identification of a first plurality of keypoint features of the first image;
identification of a second plurality of keypoint features of the second image; and
performance of pairing of the first and second plurality of keypoint features of the first and second images.

9. The storage medium of claim 7, wherein determination of whether the first and the second image have at least one similar object comprises:

generation of a set of similar keypoint feature pairs, wherein the keypoint features of a similar keypoint feature pair are determined to be similar based at least in part on a result of the determination of similarity between the corresponding immediately adjacent and circularly surrounding adjoin features of the keypoint features of the similar keypoint feature pairs; and output of the set of similar keypoint feature pairs.

10. The storage medium of claim 9, wherein process one or more images further includes highlight at least an object in the first image based at least in part on some of the keypoint features of the first image that are members of the set of similar keypoint feature pairs.

11. The storage medium of claim 10, wherein highlight at least an object comprises bound the object with a geometric primitive.

12. The at least one non-transitory storage medium of claim 7, wherein the first and second plurality of adjoin features are generated based at least in part on an adjoin feature order; and wherein given a first keypoint feature of $s_i=[X_i, r_i, \theta_i, f(X_i, r_i, \theta_i)]^T$, an adjoin feature order of K, the K immediately adjacent and circularly surrounding adjoin features of $s_i$ comprises $s_i^{*k}=[X_i^{*k}, r_i, \theta_i, f(X_i^{*k}, r_i, \theta)]^T$ where $X_{i}^{*k}=X_i+2r_i[\cos(\alpha_k), \sin(\alpha_k)]^T$, $\alpha_k=\theta_i+2\pi k/K$, k=1,2, ... K−1, $r_i$ and $\theta_i$ are point size and orientation of the keypoint feature $s_i$, and $f(X^{*k}_i, r_i, \theta_i)$ comprises local spatial relationships of keypoint feature $s_i$.

13. An apparatus for processing one or more images, comprising:

one or more processors; and a storage medium coupled to the one or more processors, and having a plurality of modules configured to cause the apparatus, in response to operation by the one or more processors, to perform processing of a plurality of images, wherein performance of the processing includes:

generation of a plurality of pairs of keypoint features, with each pair of keypoint features including a first keypoint feature from a first of the one or more images, and a second keypoint feature from a second of the one or more images;

for each pair of keypoint features, generation of a first plurality of adjoin features for the first keypoint feature of the keypoint feature pair, and a corresponding second plurality of adjoin features for the second keypoint feature of the keypoint feature pair, wherein the first plurality of adjoin features for the first keypoint feature are immediately adjacent and circularly surrounding the first keypoint feature, and the second plurality of adjoin features for the second keypoint feature are immediately adjacent and circularly surrounding the second keypoint feature;

for each pair of keypoint features, determination of whether an immediately adjacent and circularly surrounding adjoin feature of the first keypoint feature of the keypoint feature pair is similar to the corresponding immediately adjacent and circularly surrounding adjoin feature of the second keypoint feature of the keypoint feature pair; and determination of whether the first and the second image have at least one similar object, based at least in part on a result of the determination of similarity between the corresponding immediately adjacent and circularly surrounding adjoin features of the first and second keypoint features of the keypoint feature pairs;

wherein the first and second plurality of immediately adjacent and circularly surrounding adjoin features are generated based at least in part on an adjoin feature order; and wherein given a first keypoint feature of si defined by at least $[X_i, r_i, \theta_i,]^T$, an adjoin feature order of K, the K immediately adjacent and circularly surrounding adjoin features of $s_i$ comprises $s_i^{*k}$ defined by at least $[X^{*k}_i, r_i, \theta_i]^T$, where $X^{*k}_i$ is defined by at least $[X_i, r_i \text{ and } \alpha_k]$, where $\alpha_k=\theta_i+2\pi k/K$, k=1,2, ... K−1, $r_i$ and $\theta_i$ are point size and orientation of the keypoint feature $s_i$.

14. The apparatus of claim 13, wherein performance of processing one or more images further includes highlight at least an object in the first image based at least in part on some of the keypoint features of the first image that are members of a set of similar keypoint feature pairs.

15. The apparatus of claim 13, wherein the apparatus is a selected one of a set-top box, a smartphone, a computing tablet, an ultrabook, a laptop computer, a desktop computer, a server computer, a game console, or a media player.

16. The apparatus of claim 13, wherein the first and second plurality of adjoin features are generated based at least in part on an adjoin feature order; and wherein given a first keypoint feature of $s_i=[X_i, r_i, \theta_i, f(X_i, r_i, \theta_i)]^T$, an adjoin feature order of K, the K immediately adjacent and circularly surrounding adjoin features of $s_i$ comprises $s_i^{*k}=[X_i^{*k}, r_i, \theta_i, f(X_i^{*k}, r_i, \theta)]^T$ where $X^{*k}_i=X_i+2r_i[\cos(\alpha_k), \sin(\alpha_k)]^T$, $\alpha_k=\theta_i+2\pi k/K$, k=1,2, ... K−1, $r_i$ and $\theta_i$ are point size and orientation of the keypoint feature $s_i$, and $f(X^{*k}_i, r_i, \theta_i)$ comprises local spatial relationships of keypoint feature $s_i$.

* * * * *